June 2, 1953

R. A. BECWAR 2,640,704

RECORD CHANGER MECHANISM

Filed May 1, 1946

5 Sheets-Sheet 1

INVENTOR.
RUDOLPH A. BECWAR
BY Mueller and Mason
ATT'YS

June 2, 1953 R. A. BECWAR 2,640,704

RECORD CHANGER MECHANISM

Filed May 1, 1946 5 Sheets-Sheet 2

INVENTOR.

RUDOLPH A. BECWAR

BY Mueller and Mason

ATT'YS

June 2, 1953 R. A. BECWAR 2,640,704

RECORD CHANGER MECHANISM

Filed May 1, 1946 5 Sheets-Sheet 3

INVENTOR.
RUDOLPH A. BECWAR
BY Mueller and Mason

ATT'YS

June 2, 1953 R. A. BECWAR 2,640,704

RECORD CHANGER MECHANISM

Filed May 1, 1946 5 Sheets-Sheet 4

INVENTOR.
RUDOLPH A. BECWAR
BY Mueller and Mason
ATT'YS

June 2, 1953 R. A. BECWAR 2,640,704

RECORD CHANGER MECHANISM

Filed May 1, 1946 5 Sheets-Sheet 5

INVENTOR.
RUDOLPH A. BECWAR
BY Mueller and Mason
ATT'YS

Patented June 2, 1953

2,640,704

UNITED STATES PATENT OFFICE 2,640,704

RECORD CHANGER MECHANISM

Rudolph A. Becwar, Berwyn, Ill., assignor to Motorola, Inc., a corporation of Illinois Application May 1, 1946, Serial No. 666,490

7 Claims. (Cl. 274—10)

This invention relates generally to automatic phonograph devices and more particularly to a record changer mechanism adapted to automatically change a plurality of records which are played in succession. Specifically, the invention is an improvement on my prior U. S. Letters Patents 2,293,703 and 2,328,703, both assigned to the same assignee as the present application.

Automatic phonograph devices customarily include cam and lever mechanisms for controlling a record changing cycle. It has been common practice to employ a rather elaborate cam wheel having one or more cam surfaces, the contours of which must be accurately formed and timed with relation to one another for successively controlling the movements of a tone or pick-up arm and a record release mechanism. The various cam surfaces on the cam wheel heretofore operated to perform these control functions through one or more levers connected to the tone or pick-up arm and the record release mechanism. Such mechanisms have usually been very complicated and the adjustment thereof has been quite critical. In shipping or in other rough handling of the mechanism, the critical relationships between the various levers and cams were often disturbed with the resultant faulty operation of the mechanism. It is very desirable to provide a record changer mechanism for an automatic phonograph which inherently does not include delicate apparatus which can be damaged even when subjected to normal use by unskilled operators.

In prior art record changers, it was customary to latch the record changing device in an inoperative position. Such latching means were usually quite complicated. When the record changing cycle was to be initiated, it was necessary to release the latching means and a friction drive for the record changing mechanism was thrown into engagement with the turntable. Such arrangements are not only complicated and expensive to manufacture, but are fairly delicate and are subject to injury. It would be desirable to provide a record changer mechanism in which complicated latching arrangements for holding the friction drive means for the record changer mechanism from engagement with the turntable can be completely eliminated.

In automatic phonographs, it is desirable for the turntable to operate at a constant velocity so that the wow percentage is maintained at a minimum. When a light turntable is employed, it does not have sufficient momentum to carry it over friction peaks which tend to decrease the velocity, and as a result, undesirable slowing down of the turntable occurs. It would be desirable to provide an automatic phonograph in which the record changer mechanism inherently requires a relatively heavy turntable, whereby the turntable serves greatly to reduce the wow percentage and thereby improves the operating characteristics of the phonograph.

Accordingly, it is an object of the present invention to provide a record changer mechanism for an automatic phonograph which has none of the disadvantages enumerated above.

It is another object of the present invention to provide an improved record changer mechanism for an automatic phonograph.

Yet another object of the present invention is to provide for an automatic phonograph, an improved record changer mechanism controlled by a spiral cam integrally formed with the turntable and arranged on the under side thereof.

It is a further object of the present invention to provide a record changer mechanism for an automatic phonograph which inherently requires a heavy turntable whereby the wow percentage of the automatic phonograph is reduced to a minimum.

Still a further object of the present invention is to provide an improved record changer mechanism which is simple in design, compact and sturdy in construction, comprised of a minimum number of parts which require adjustment and which is efficient and positive in operation.

Another object of the present invention is to provide a record changer mechanism in which the turntable is provided with a pair of integral reversely directed spiral grooves which are effective during the record changing cycle to move an arm first in one direction and then in the other to control not only the record release mechanism but also the tone or pick up arm.

It is the further object of the present invention to provide a record changer mechanism for an automatic phonograph employing a velocity trip arrangement for rendering a spiral groove arrangement on the underside of the phonograph turntable effective to control the record changing cycle.

Further objects and advantages of the present invention will become apparent as the following description proceeds and the features of novelty which characterize this invention will be pointed out with particularity in the claims annexed to and forming a part of this specification.

For a better understanding of the present invention, reference may be had to the accompanying drawings in which.

Figures 1, 2:
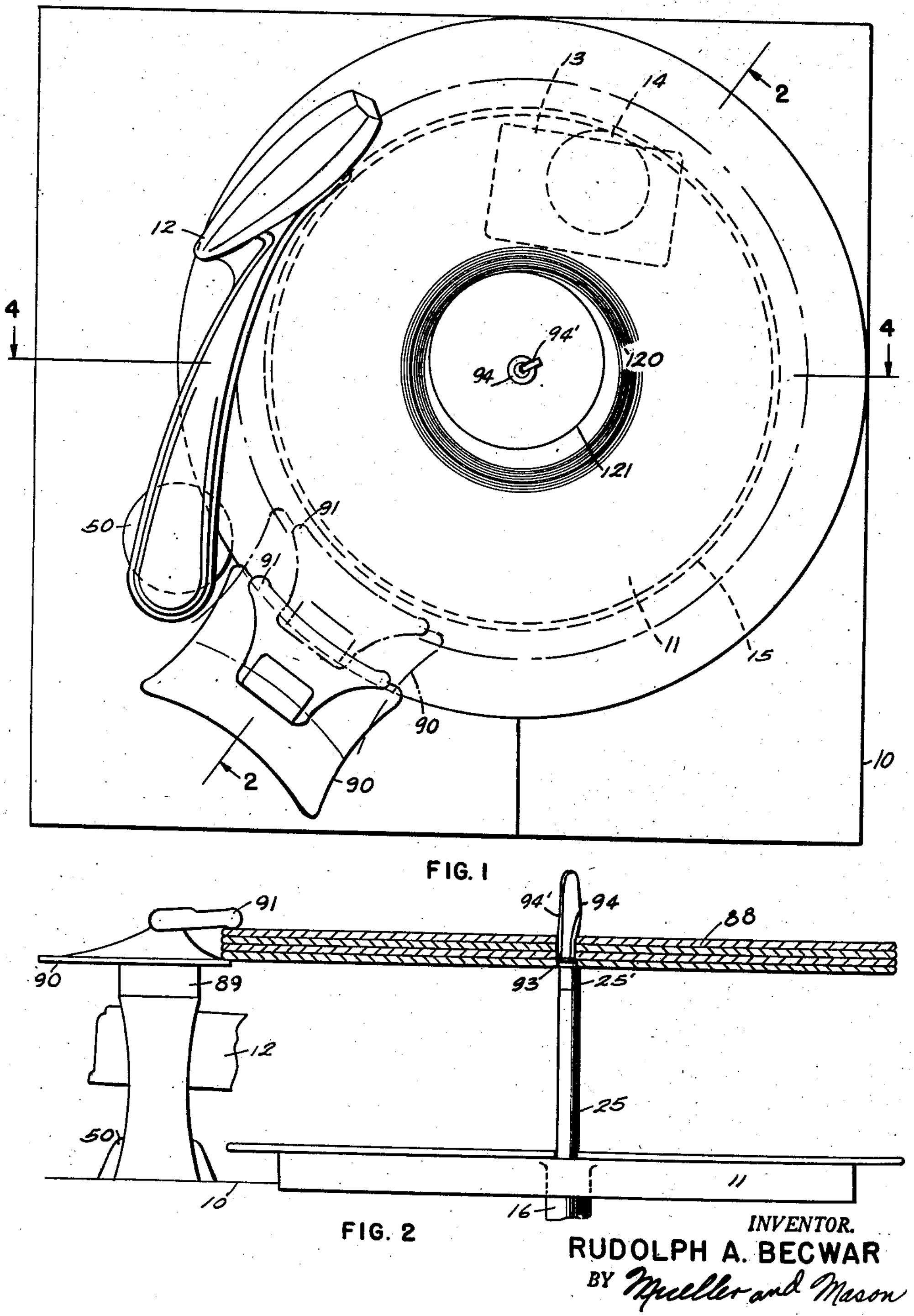
Fig. 1 is the top plan view of an automatic phonograph embodying the record changing mechanism of the present invention with a 12 inch record shown in playing position on the turntable and with the records removed from the record stack.
Fig. 2 is a sectional view taken on line 2—2 of Fig. 1 but modified to show the record release mechanism in the position it assumes midway through the record changing cycle and with the record stack in position.

The present invention contemplates the use of disk type records wherein the unplayed records are stacked in a supported position above the turntable of the phonograph or like machine, means being provided for successively releasing the lowermost or bottom record in the stack of unplayed records to provide for its falling into a playing position on the turntable. A stationary support for the record stack is provided beyond the circumference of the turntable and this stationary support is adjustable so that it may be used equally well with either 10 inch or 12 inch records. This adjustable supporting means automatically controls the angular return movement of the tone or pick up arm in correspondence with the size of the record on the turntable so that the tone arm is set down at the beginning of the record regardless of whether 10 inch records or 12 inch records are being played. A pair of reversely directed spiral grooves defining control cams on the underside of the turntable, one a lead-in cam, the other a lead-out cam, control the record changing cycle by causing a main control arm to pivot first in one direction and then in the other, this main control arm being effective to operate the record release mechanism and also to move the tone or pick up arm first away from the record which has been played so that a new record may be dropped onto the turntable and then back into the correct playing position whether a 10 inch or a 12 inch record is to be played.

Referring now to the drawings, there is illustrated the usual top or mounting plate 10, turntable 11, and tone or pick up arm 12 for an automatic phonograph or like machine. The top plate 10 illustrated as a plate of sheet material in the drawings is preferably a die casting horizontally positioned as of course is also the turntable 11. The turntable is illustrated as being driven by a low voltage induction motor 13 suitably supported from the plate 10 which motor is provided with a friction wheel 14 which is in frictional engagement with the skirt or rim 15 of the turntable 11. The turntable 11 is also provided with a hub 16 integrally formed therewith as is best shown in the enlarged view of Fig. 6, which hub is provided with a lug or dog 17, the purpose of which will become apparent as the following description proceeds. The hub 16 of the turntable is rotatable about a bushing record post 18 which is fastened to the mounting plate 10 as by clamping the plate 10 between a shoulder 18′ of post 18 and a clamping nut 19, a suitable washer 20 being interposed if desired. To reduce the rotating friction, a plurality of ball bearings 21 are preferably retained between a turntable bearing 22 and a thrust bearing 23 at the bottom end of the hub 16 for supporting the weight of the turntable. In order to support the upper end of the hub 16 of the turntable 11, a recess is provided in hub 16 to accommodate a porous bronze bearing 24 which engages the outer circumference of the bushing record post 18. The upper end of the bushing record post 18 is provided with a portion of reduced diameter over which is fitted a record post 25, preferably formed of seamless tubing and fastened to the bushing record post 18 as by a press fit. A hollow rotatable shaft 26 is disposed within the record post 25 and the bushing record post 18 which latter post is provided with an off-center opening to accommodate shaft 26, the purpose of which will become apparent from the following description.

Figure 5:
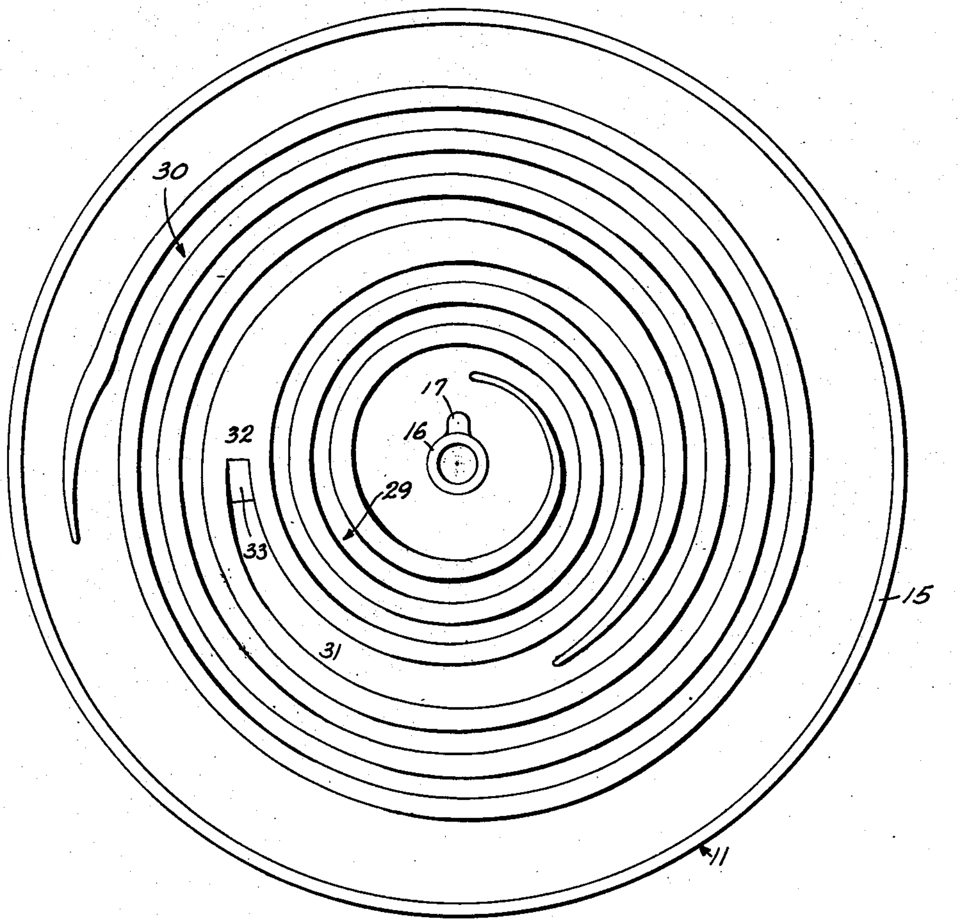
Fig. 5 is a view of the underside of the turntable showing the pair of reversely directed spiral grooves providing the spiral cams which are integral with the turntable.

In accordance with the present invention, the turntable 11 is provided on the underside thereof with a pair of oppositely directed spiral grooves 29 and 30 best shown in Fig. 5 of the drawings. The spiral groove 29 will be referred to hereinafter as the "lead-out" cam 29, while the spiral groove 30 will be referred to hereinafter as the "lead-in" cam 30 since as will become apparent from the following description, they perform functions which cause a main control arm to be led out from the center to the outside of the turntable or to be led in from the outside of the turntable to the center respectively. The spiral groove 29, which is a spiral of increasing diameter starting at the center of the turntable 11 joins the spiral groove 30 which is a spiral of decreasing diameter starting at the outside of the turntable 11 at a section intermediate the hub 16 and the rim or skirt 15 of the turntable 11 indicated at 31 in Fig. 5 of the drawings, which section of groove 31 is common to both groove 29 and groove 30. The raised portions defining the edges of the grooves 29 and 30 on either side of the common section or portion 31 of these grooves come together to form a wide raised portion 32, the beginning of which may be considered the end of both the lead-out cam 29 and the lead-in cam 30. A suitable incline 33, best shown in Fig. 5 of the drawings connects the wide raised portion 32 with the groove section 31 common to both the lead-out cam 29 and the lead-in cam 30. This incline 33 performs an important control function as will be described hereinafter. Preferably, turntable 11 is die cast so that all the parts thereof such as the spiral cams 29 and 30, the hub 16, the lug 17, and the rim or skirt 15 are one integral unit. Such a die cast turntable including the cams 29 and 30 provides a fairly heavy turntable construction which is very desirable from the standpoint of the operation of the automatic phonograph embodying the present invention since the substantial mass thereof when rotated at normal speed by motor 13, will have sufficient momentum to carry it over high friction peaks which might be applied thereto by various parts of the associated mechanism without any noticeable decrease in velocity thereby greatly reducing the wow percentage of the phonograph.

In order that the lead-out and lead-in cams 29 and 30 respectively may be rendered effective to control the record changing cycle of the automatic phonograph, there is provided in accordance with the present invention a main arm 36 which is pivotally mounted to the mounting plate 10 of the automatic phonograph by suitable means indicated at 37. Main arm 36 comprises a central portion 36*a* which is close to and substantially parallel with the plate 10, a downwardly extending angular portion 36*b* connected to one end of portion 36*a*, a horizontal portion 36*c* connected to portion 36*b* which in turn is connected to an arcuate portion 36*d* including an inclined portion 36*e* interconnecting portions 36*c* and 36*d* which inclined portion 36*e* functions as the tone or pick-up arm raise cam. Connected to the other end of the portion 36*a* of the main control arm 36 and extending downwardly at substantially a right angle therewith is a portion 36*f* connected to a portion 36*g* which is substantially parallel to the portion 36*a*. A shallow notch 36*h* is provided in the end of portion 36*g* of the main control arm 36, while a horizontally positioned tab 36*k* is provided adjacent the portion 36*b* and is preferably punched out from the angular portion 36*b*. At the end of the portion 36*a* of the main control arm 36, adjacent the portion 36*f* thereof, there are provided a pair of upwardly extending integral supporting members 38 and 39 pivotally supporting a cam follower 40 on a pivot pin 43 which extends through suitable openings in members 38 and 39.

The cam follower 40 is indicated as a U-shaped member having fastened to either end thereof a pair of upwardly extending pins 41 and 42 respectively. The pin 41 is adapted to cooperate with the spiral lead-out cam 29, while the pin 42 is adapted to cooperate with the spiral lead-in cam 30.

Attached to the cam follower 40 is a spring holding arm 44. A leaf spring 45 is interposed between an extension 44′ of the spring holding arm 44 and a member 46 supported on the main arm 36. This lead spring 45 acts as an over center spring causing the cam follower 40 to be positioned either with the pin 41 moved toward the spiral lead-out cam 29 on the underside of the turntable 11 and the pin 42 raised away from the lead-in cam 30 as shown in solid lines in Fig. 6 of the drawings, or as shown in dotted lines in Fig. 6 of the drawings where the cam follower 40 is pivoted in the opposite direction. It will be apparent that rotation of the turntable 11 when pin 41 is effectively engaged with the lead-out cam 29 will cause the cam follower 40 and consequently the portion of arm 36 fastened thereto to move from the center toward the outside of the turntable. When the pin 41 reaches the end of spiral groove 29 it engages the incline 33 and continued rotation of the turntable causes pin 41 to move up the incline 33 thereby pivoting cam follower 40 until over center spring 45 causes cam follower 40 which has moved so that pin 42 is near the rim 15 of the turntable to pivot about pin 43, whereby pin 42 is moved into engagement with lead-in cam 30 as is shown in dotted lines in Fig. 6 of the drawings. Incline 33 performs a similar function with respect to pin 42 when it has moved to the end of spiral groove 30 from the dotted position shown in Fig. 6 of the drawings thereby causing cam follower 40 to pivot about pin 43 in a clockwise direction as viewed in Fig. 6 so that over center spring 45 biases pin 41 toward the underside of the turntable and pin 42 away from the underside of the turntable.

It is apparent from the above description that the incline 33 rotates the cam follower 40 about its pivot 43 when either pin 41 or pin 42 reaches the end of its associated spiral groove 29 or 30 respectively. In other words, incline 33 selectively controls the position of cam follower 40 with reference to whether lead-out cam 29 or lead-in cam 30 is to be effective to control the movement of main arm 36. Whenever lead-out cam 29 is rendered effective to engage pin 41, rotation of the turntable 11 will cause arm 36 to swing about its pivot 37 first in a counterclockwise direction as viewed in Fig. 3 of the drawings and then in a clockwise direction to return to its initial position. The specific arrangement of the spiral cams and the cam follower 40 described above insures such complete cycling operation of arm 36 once it begins to swing about its pivot 37. In order to limit the pivotable movement of cam follower 40 about its pin 43, a pair of stop members 47 and 47′ are provided on main arm 36. The stop member 47′ limits the movement of pin 41 toward lead-out cam 29 on the underside of turntable 11 while the stop member 47 limits the movement of pin 42 toward the lead-in cam 30 on the underside of the turntable 11.

Figures 6, 7, 11:
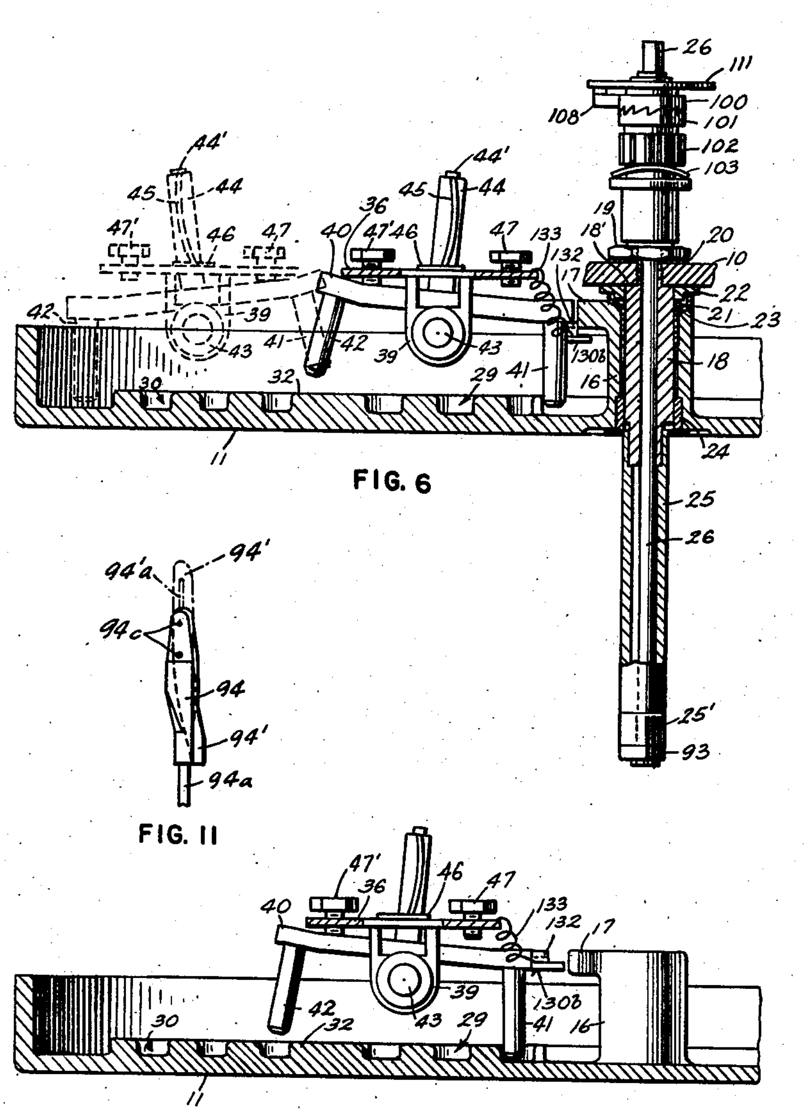
Fig. 6 is an enlarged sectional view taken along the line 6—6 of Fig. 3 with the record changing mechanism in the normal position prior to the beginning of the record changing cycle.
Fig. 7 is a partial view of Fig. 6 showing the record changing mechanism in the position assumed following actuation of the velocity trip device when the spiral cams are rendered effective to control the record changing cycle.
Fig. 11 is a view showing certain details of a portion of the record changing mechanism.

When the cam follower 40 is in the position shown in solid lines in Fig. 6 of the drawings, the spiral grooves 29 and 30 are ineffective to cause movement of the main arm 36. Suitable means such as a detent 48*a* is provided to engage the notch 36*h* in the arm 36 to hold the arm 36 against a stop member 48 or the like specifically shown in Fig. 3 of the drawings as a post extending from the plate 10 whereby the cam follower 40 and the arm 36 remain in the solid line positions shown in Fig. 6 of the drawings at all times except during the record changing cycle as will be described hereinafter. A second detent 48*b* may also be provided to engage notch 36*h* when the main arm 36 has moved to the dotted position shown in Fig. 6 of the drawings to hold the arm in this position momentarily until cam follower 40 has pivoted so that pin 42 is engageable with lead-in cam 30.

Figure 3:
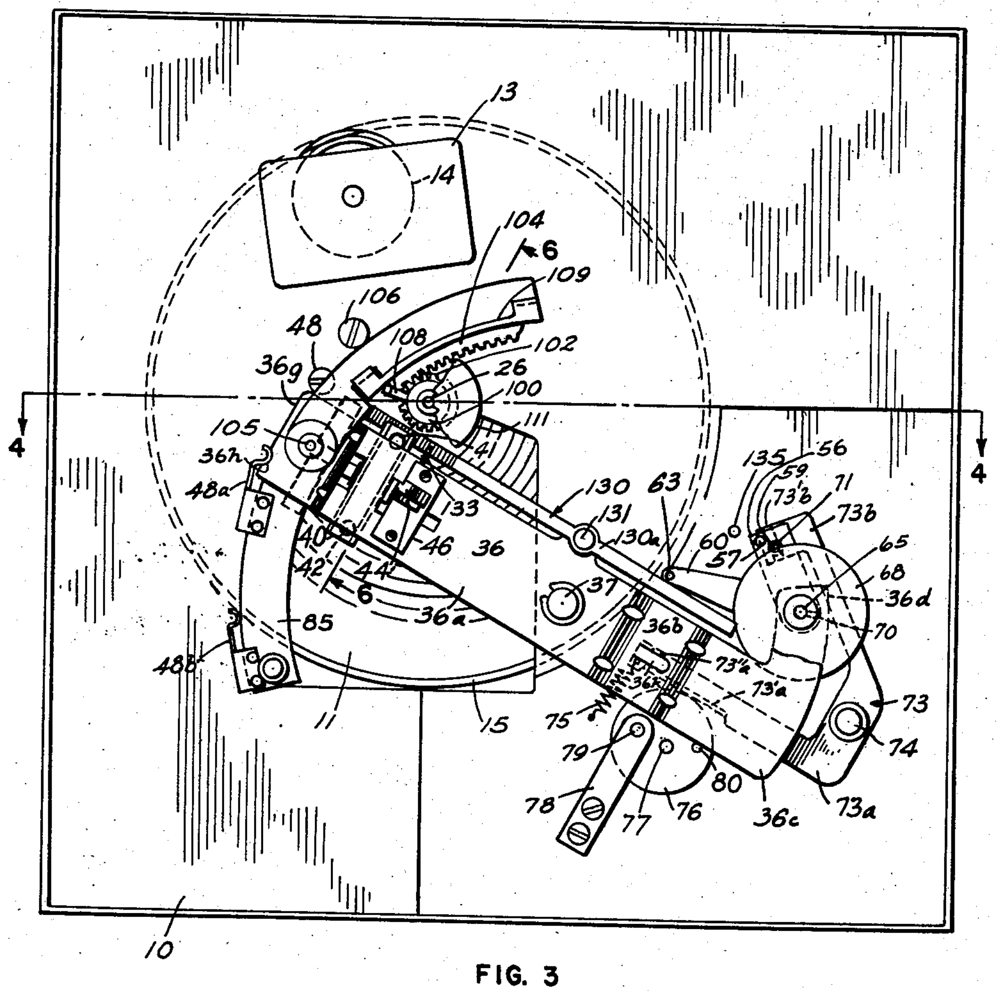
Fig. 3 is a bottom view of the portion of the automatic phonograph shown in Fig. 1 and drawn to the same scale as in Fig. 1.
Figure 4:
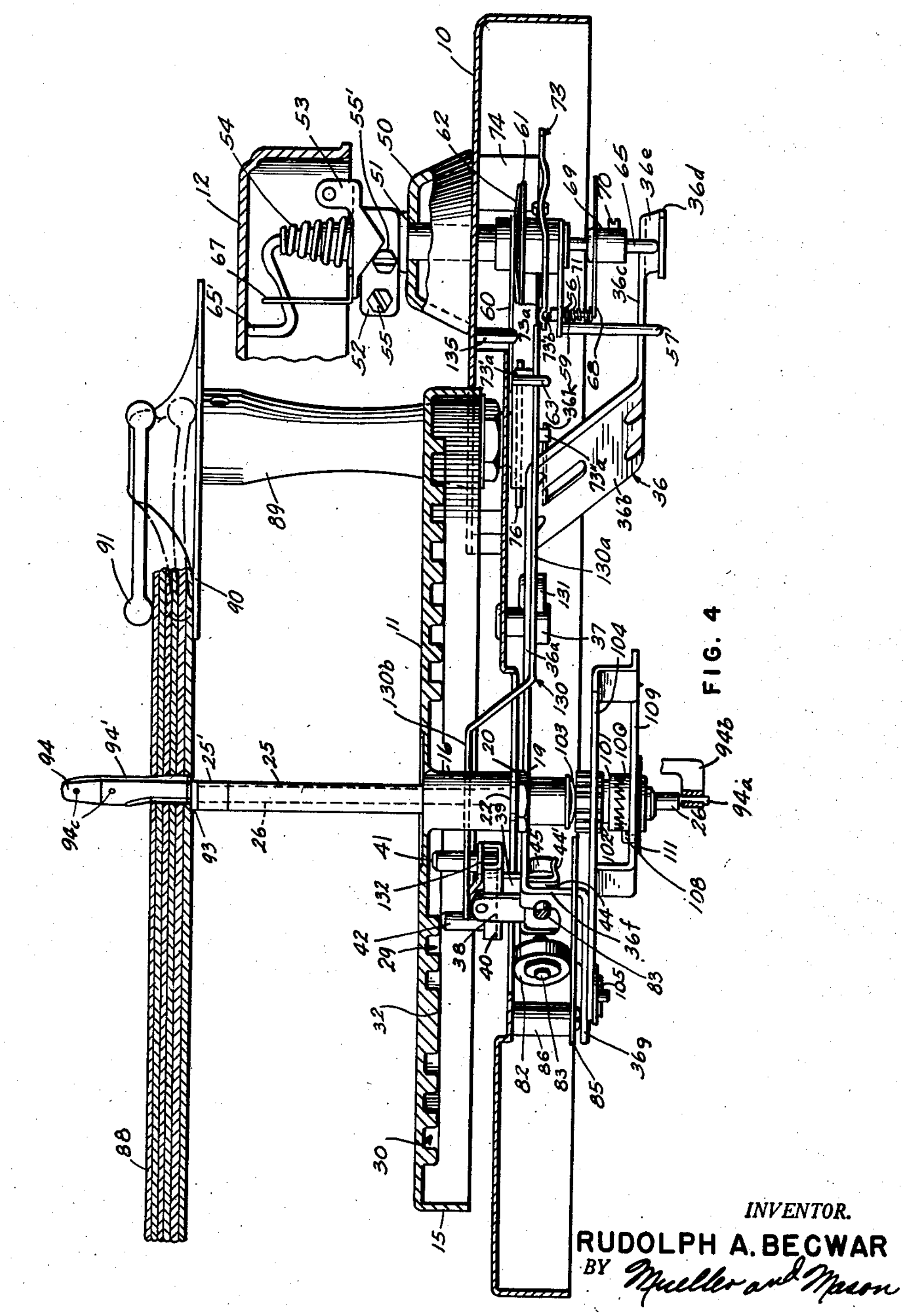
Fig. 4 is a sectional view taken along lines 4—4 of Figs. 1 and 3, assuming that Fig. 3 is inverted so as to be properly positioned with reference to Fig. 1, modified to show the record stack in position but with no record on the turntable.

With the arrangement described thus far, it is apparent that if suitable means are provided for moving arm 36 a short distance away from stop member 48 about pivot 37, the spiral lead-out cam 29 will be rendered effective, to cause arm 36 to move in a counterclockwise direction as viewed in Fig. 3 of the drawings until the incline 33 causes cam follower 40 to pivot about its pin 43, whereupon the leading cam 30 becomes effective to move the arm 36 back to its initial position against stop 48. In accordance with the present invention, this movement of arm 36 is used to control and operate all the necessary devices during a record changing cycle. In the operation of record changing mechanisms for automatic phonographs, it is well known that when a recording has been played, it is necessary to lift the tone or pick-up arm from the record and move it to one side so that a new record may be moved into position whereupon the tone arm is returned. In other words, upon the completion of playing of a record, the tone arm is both lifted and moved outwardly from the played record before a new record is put into playing position. The means in the present invention for accomplishing this predetermined operation of the tone arm is best shown in Figs. 3 and 4 of the drawings and as has been pointed out above, is controlled solely in response to the cyclic movement of main control arm 36 during a record changing operation.

The tone arm or pick-up unit 12 is supported on a rotatable shaft 51 extending through the mounting plate 10 of the automatic phonograph. A suitable member 50 may be provided to act as a guide and support for the shaft 51. To prevent damage to the mechanism in the event the tone arm is grasped manually and moved about its pivotal support it is preferably fixed to tone arm shaft 51 by means of a friction clutch arrangement comprising members 52 and 53 which are biased into clutching engagement by means of a spring 54. The clutch member 52 is clamped to shaft 51 by suitable means such as clamping bolts 55 while the cooperating clutch member 53 is suitably fastened to the tone arm 12. An adjusting screw 55′ is provided in member 52. With this arrangement the tone arm 12 may be rotated relative to the shaft 51 if a predetermined force is applied thereto while for some reason or other shaft 51 is prevented from rotating therewith. Fixed to the shaft 51 for rotation therewith at a point below the top mounting plate 10 of the automatic phonograph is a secondary tone arm lever 56 which is provided with a downwardly extending pin 57 which extends into the path of movement of the portion 36*c* of the main control arm 36. Secondary tone arm lever 56 is provided with an opening through which a selector arm pin 59 to be described in greater detail hereinafter extends, which selector arm pin is reciprocally removable therethrough. In addition to the secondary tone arm lever 56 which is fixed to the shaft 51, there is also provided a friction arm 60 which is frictionally related to tone arm shaft 51 so as to rotate therewith if no force is applied thereto to prevent such action. A suitable friction washer 61 formed of Bakelite or the like and a spring washer 62 provide the desired friction between friction arm 60 and the tone arm shaft 51. Friction arm 60 is provided with a downwardly extending pin 63, the purpose of which will be pointed out in the description included hereinafter.

In order to raise the tone arm from the played record which is substantially the first step in a record changing cycle, there is provided a tone arm raise pin 65 which extends through a central opening in the tone arm shaft 51. The raise pin 65 is not only rotatable with the shaft 51 but is also vertically movable relative thereto. The upper end 65′ of the tone arm raise pin 65 is adapted for operative engagement with the tone or pick-up arm 12 so that lifting or raising of the pin 65 in a vertical direction lifts the pick-up arm from a record which is in playing position. Lowering of the raise pin 65 on the other hand lowers the pick-up unit or tone arm. The lower end of tone arm raise pin 65 is in engagement with the arcuate extension 36*d* of the main control arm 36. When the main control arm 36 first begins to operate by rotating in a counterclockwise direction as viewed in Fig. 3 of the drawings, the tone arm raise pin 65 moves up the incline 36*e* so that the tone arm or pick-up unit 12 is lifted from the record in playing position on the turntable. Continued swinging movement of the main arm 36 in this counterclockwise direction as viewed in Fig. 3 of the drawings causes the portion 36*c* thereof to engage the downwardly extending pin 57 fastened to the secondary tone arm lever 56, thereby rotating the tone arm shaft 51 and consequently moving the tone arm or pick-up unit 12 to one side of the turntable so that a new record may be dropped into playing position. The tone arm raise pin 65 also rotates as the tone arm 12 rotates since the upper portion 65′ extends through a member 67 fastened to the clutch member 53. This member 67 is provided with a slotted opening to permit vertical movement of the tone arm raise pin 65. In addition, the selector arm pin 59 described above, is held in position in the opening in the secondary tone arm lever 56 by means of a relatively large spring washer 68 which is fixed to a hub member 69 and fastened by suitable means such as a set screw 70 to the tone arm raise pin 65. A compression spring 71 interposed between the head of selector arm pin 59 and the secondary tone arm lever 56 normally biases pin 59 downwardly against washer 68 to the position shown in Fig. 4 of the drawings, the purpose of which will be brought out later in this description. Washer 68 is free to rotate relative to pin 59 whereby the relative positions of the tone arm raise pin 65 and the tone arm shaft 51 may be adjusted through operation of adjusting screw 55′ without loosening the set screw 70.

In addition to raising the tone arm or pick-up unit 12 and moving it to one side of the turntable so that a new record may be moved to the playing position, it is also necessary to provide means for returning the tone or pick-up arm to the initial playing position at the beginning of the record, which position will vary in dependence upon whether a 10 inch or 12 inch record is moved to the playing position. To accomplish this return movement of the tone arm, there is provided a U-shaped selector member 73 pivotably mounted to the top or mounting plate 10 as indicated at 74. The U-shaped selector member 73, is biased by means of a spring 75 connected to one arm portion 73*a* thereof so that an upwardly extending integral portion 73′*a* thereof is moved into engagement with a selector disk 76 pivotally mounted as indicated at 77. Also a downwardly extending portion 73″*a* of the arm portion 73*a* extends into the path of movement of the tab 36*k* of the main control arm 36 as is best shown in Fig. 4 of the drawings so that movement of the main control arm 36 during the first half of its cycle moves the selector member 73 against the bias of spring 75. Disk 76 is eccentrically mounted and is adapted to assume two predetermined positions which are controlled by a spring selector arm 78 having an embossed detent portion 79 adapted to move into one or the other of a pair of openings 80 in selector disk 76 whereby it is held in one of two predetermined positions. The other arm 73b of the U-shaped selector member 73 has a portion including a groove 73'b which is adapted to be engaged with selector arm pin 59 when the tone arm raise pin 65 and consequently the pin 59 are moved to their uppermost positions. When the main control arm 36 has moved in a counterclockwise direction, as viewed in Fig. 3 of the drawings, to the maximum extent so that the lead-in cam 30 is rendered effective to return main control arm 36 to its position against stop 48, pin 57 during the return movement of arm 36 is no longer engaged by the portion 36c of the main arm 36. Consequently, during the return movement of main arm 36 and while the tone arm 12 is still in the raised position, spring 75 biases the selector member 73 in a counterclockwise direction as viewed in Fig. 3 of the drawings with the result that pin 59 engaged in the groove 73'b thereof is moved and consequently the tone arm is rotated until the upwardly extending portion 73'a of the selector member has moved against selector disk 76. Depending upon in which of its two predetermined positions the selector disk 76 happens to be, the tone arm is returned to its initial playing position for either a 10 inch or 12 inch record. As shown in Fig. 3 of the drawings, the selector disk 76 is set for playing a 12 inch record but if it were rotated so that the aperture 80 therein visible in Fig. 3 of the drawings were engaged by the embossed detent 79 of the spring selector 78, the selector member 73 would move still farther under the bias of spring 75 with the consequent movement of the tone arm farther toward the center of the turntable 11 to the starting point of a 10 inch record. It will be understood that just before the main arm 36 returns to its initial position against the stop 48 that the tone arm raise pin 65 moves down the incline 36e whereby the tone arm or pick-up unit 12 is lowered into playing engagement with the record on turntable 11.

Another purpose of the spring washer 68 which permits pin 59 to move downwardly a predetermined amount is to take care of the situation where the tone arm 12 has been moved when the phonograph is not being operated so that the pin 59 is underneath the arm 73b of the selector member 73. If the record changing cycle is now initiated so that the pin 59 moves upwardly with the tone arm raise pin 65, against the underside of arm 73b, it will not jam the mechanism but will be depressed to deflect washer 68 until the operation has proceeded to the point where the portion 36k of the main arm 36 engages extension 73''a of the selector member 73 to drive the selector member 73 until the groove 73'b in the arm 73b is in line with the pin 59 whereupon the spring washer 68 and spring 71 will move pin 59 upwardly into its controlling position with the end thereof engaging with the groove 73'b in the selector member 73.

In order to insure that the main control arm 36 has the horizontal portions thereof always maintained in a horizontal position, it may be desirable to provide suitable means such as a plurality of wheels indicated at 82 rotatably supported by suitable pins 83 fastened to the vertical portion 36f of the main arm 36. One of the wheels 82 has been removed in Fig. 4 of the drawings in order more clearly to illustrate the parts of the record changing mechanism. The wheels are in engagement with the top or mounting plate 10 and also in engagement with a member 85 in the form of an arcuate track supported from top or mounting plate 10 but spaced therefrom by suitable spacing means 86 a sufficient distance to accommodate the supporting wheels 82 therebetween. With this arrangement, the main control arm 36 is maintained in the desired position at all times during the operating cycle thereof. If desired the detents 48a and 48b described above may be supported from the member 85 as shown in Fig. 3 of the drawings.

As is disclosed in my prior patents referred to above, a stack of unplayed records, generally designated at 88 in Figs. 2 and 4 is supported above the turntable at their centers on the tubular stationary centering pin or record post 25 which extends upwardly from the turntable 11 and at their peripheries by an edge support comprising a pedestal 89 extending upwardly from the mounting plate 10 and having a record supporting ledge 90 at its upper end. The record supporting ledge 90 is offset with respect to the pedestal 89 and is rotatable through substantially 180 degrees to edge supporting positions for either a stack of 10 inch or 12 inch records, the position of the ledge 90 for 12 inch records being shown in solid lines in Figs. 1, 2, and 4 of the drawings, with its position for supporting 10 inch records being shown in dotted lines in Fig. 1 as is also a 10 inch record. The selector disk 76 described above is rotatable with the ledge 90 and is connected thereto by suitable means not shown. It will now be apparent that the position of selector disk 76 which is rotatable with the ledge 90 depends upon whether the ledge 90 is positioned for supporting either 10 inch or 12 inch records. A suitable weight 91 pivotably mounted to ledge 90 is provided to press downwardly on the record stack 88. It will be apparent that this weight may be employed as a control member to stop the automatic phonograph when all of the records have been transferred to the turntable and played.

The hollow shaft 26, described above, and rotatable in the eccentric bore within the record post bushing 18 forms an essential portion of a record ejector unit to be described hereinafter. Mounted on the upper end of the shaft 26 is an ejector eccentric portion 93. This eccentric ejector portion 93 is adapted to be rotated with shaft 26 so as to be moved into a position concentric with record post 25 as is shown in Fig. 4 of the drawings or out of the position concentric with the post 25 as is shown in Fig. 2 of the drawings. A cap member 94 having a relatively movable positioning tongue 94' best shown in Figs. 1, 4 and 11 of the drawings including a stem or shaft 94a is normally mounted on the record post 25 above eccentric 93 with the stem 94a extending through hollow shaft 26. Cap 94 is held stationary by means of a bracket 94b fastened to any stationary portion of the apparatus engaging the end of stem 94a extending out of the lower end of the hollow shaft 26 as is shown in Fig. 4 of the drawings. When the eccentric ejector 93 is rotated to the position shown in Fig. 2 of the drawings where it is no longer concentric with the record post 25, it is then concentric with the adjoining edge of cap 94 and the positioning tongue 94'. As is best shown in Fig. 11 of the drawings the positioning tongue 94' is slidably movable in a longitudinally extending groove in cap 94. The tongue 94' is also provided with a slot 94'a and is held in position in cap 94 by pins 94c extending through the slot 94'a. In its normal lower position shown in solid lines in Fig. 11 of the drawings the tongue 94' causes lateral movement of a record slipped over cap 94 from the top. When a record is slipped over cap 94 from the bottom tongue 94' moves to the dotted line position shown in Fig. 11 of the drawings so as not to interfere with the removal of the record. The stack of records 88 positioned about cap 94 are aligned for support at their centers on the eccentric ejector 93, which portion is normally positioned concentric with the record post 25. With the records thus supported at their centers on eccentric ejector 93, and at their peripheries by ledge 90, rotation of the eccentric ejector 93 from the position shown in Fig. 4 to the position shown in Fig. 2 where it is out of concentricity with the record post 25, permits the lowermost record of the stack 88 to drop around the eccentric ejector 93 and on top of the bearing member 25' formed at the upper end of record post 25 which position is clearly shown in Fig. 2 of the drawings. Continued rotation of the eccentric ejector 93 through a full 360 degrees from the position shown in Fig. 4 of the drawings causes the lowermost record of the record stack 88 to be moved to the right as shown in Fig. 2 of the drawings so that the edge or periphery thereof drops free of the ledge 90. Also, since the eccentric ejector 93 moves back into concentricity with the record post 25, this bottom record slides down the record post 25 into playing position on the turntable 11. The record which is now the bottom record of the record stack 88 is again resting on the eccentric ejector 93 and its release into a playing position is accomplished in the same manner as described above. Upon completion of the playing of all of the records in the record stack 88, it will be understood that these records will have moved down onto the turntable 11. All of the played records may be simultaneously removed from the turntable 11 without any interference from the record release mechanism heretofore described since the tongue 94' moves to the dotted position shown in Fig. 11 of the drawings merely in response to removal of the records.

From the above description, it will be apparent that the main control arm 36 in its cycling movement, as controlled by the lead-out and lead-in cams 29 and 30 respectively, must also control the record release mechanism in timed sequence with the tone arm control mechanism described above. As is best shown in Figs. 4 and 6 of the drawings, the shaft 26 which rotatably controls the ejector mechanism, extends through the hub 16 of the turntable 11 and has fastened in fixed relationship therewith at its lower end a ratchet member 100. Ratchet member 100 is engageable with a cooperating ratchet member 101 which has integrally formed thereon a gear wheel 102. Ratchet member 101 and its integral associated gear 102 are rotatable about the shaft 26 and when the ratchet members 100 and 101 are in engagement, rotation of gear 102 in a clockwise direction as viewed from the top of Fig. 6 of the drawings will cause rotation of the shaft 26. A suitable spring 103 is provided to bias the ratchet members into engagement. Although these ratchet members have been illustrated as provided with a plurality of interengaging teeth, it should be understood that a ratchet employing a single tooth may be preferable as will become apparent from the following description.

Figures 8, 10:
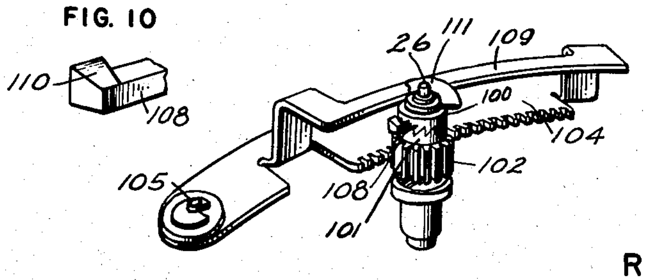
Fig. 8 is a perspective view of a portion of the apparatus shown in Fig. 6 except that the parts are shown in the positions which they assume at an intermediate instant during the record changing cycles.
Fig. 10 is an enlarged perspective view of a portion of Fig. 8.

In order to rotate shaft 26 in response to movement of main control arm 36, there is provided a gear segment 104 best shown in Figs. 3 and 8 of the drawings. This gear segment 104 is pivotably mounted as indicated at 105 to the portion 36g of the main control arm 36. A suitable post 106 (Fig. 3 of the drawings) extending downwardly from the bottom side of the mounting plate 10 causes the gear segment 104 to engage the teeth of gear 102 throughout the cyclic movement of the arm 36. When the main control arm 36 moves in a counter-clockwise direction, as viewed in Fig. 3 of the drawings, from its position against stop 48 to the position shown in dotted lines in Fig. 6 of the drawings, the gear segment 104 rotates gear 102 and consequently, shaft 26 through substantially 360 degrees. It is apparent that this rotation of shaft 26 causes the record release mechanism to perform its function of moving a new record to the record playing position. Consequently, when the arm 36 moves back to its original position, it is undesirable for shaft 26 to rotate since otherwise a second record would be released by the record release mechanism. It is for this reason that the ratchet device comprising members 100 and 101 is provided whereby the ratchet portion 101 may rotate with gear 102 without rotating ratchet 100 fixed to shaft 26. To prevent the fixed ratchet portion 100 from rotating, it is provided with an extension 108 which is adapted to cooperate with an arcuate portion 109 formed integrally with gear segment 104 but positioned at a different level, although parallel therewith in a manner clearly shown in Figs. 4 and 8 of the drawings. The arm 108 extends radially from the fixed ratchet portion 100 and is provided with a hook portion at the end thereof. One side of this hook portion is chamfered as indicated at 110 in Fig. 10 of the drawings while the other side provides a vertical plane. When the arm 36 is in its normal position against stop 48, the extension 108 has the vertical plane surface of the hook shaped end against the arcuate portion 109 as shown in Fig. 3 of the drawings. As the gear segment 104 moves to rotate gear 102 in response to movement of main arm 36, the extension 108 swings around so the chamfered ear portion thereof engages the arcuate portion 109. Actually, the gear segment 104 has a fairly loose fit about its pivot 105 so that some motion in a direction axial with respect to the ratchets and gear is permitted. A spring washer 111 fastened on the end of the shaft 26 biases the gear segment with its arcuate portion 109 toward the turntable 11. However, as the chamfered ear portion 110 of the extension 108 engages the arcuate portion 109, it raises it against the bias of the spring washer 111 and the ratchet portion 100 continues to rotate through 360 degrees back to the original position shown in Fig. 6 of the drawings. Such counterclockwise rotation of the ratchet 100 by engagement with the ratchet 101 permits the chamfered ear portion 110 of extension 108 to raise the gear segment 104 each time it engages the arcuate portion 109. When, however, the moveable arm 36 begins the second half of its operating cycle in returning from the dotted position shown in Fig. 6 of the drawings to its position against the stop 48, the vertical surface opposite the chamfered ear portion 110 engages the arcuate portion 109 so that it is not biased upwardly as during the counterclockwise rotation thereof but instead is held in the fixed position and the teeth of the ratchet 101 slip over the teeth of the ratchet 100.

With this arrangement, it is clear that during the first half cycle of operation of the main control arm 36, the gear 102 rotates shaft 26 by means of the ratchet portions 100 and 101 through 360 degrees while during the second half cycle of operation of the control arm 36, the extension 108 prevents the fixed ratchet portion 100 from rotating so that the ratchet teeth are moved apart against the bias of spring 103 and gear 102 rotates through 360 degrees in the reverse direction. A multiple of ratchet teeth such as are shown in the drawings may cause an undesirable clicking noise during such reverse rotation and that is why, as was suggested above, a ratchet having only a single tooth may be desirable.

From the above description, it is clear how the tone arm or pick-up unit 12 and the record release mechanism are operated during a record changing cycle in response to movement of the main control arm 36, these two functions being controlled in timed sequence so that the tone arm is moved out of position before a new record is moved to the playing position and then subsequently returned for playing or reproducing the new record. Suitable means must be provided, however, to render the lead-out cam effective at a desired time for as long as arm 36 is biased against stop 48, the record changing mechanism will not operate. In accordance with the present invention, suitable means are provided for giving the arm 36 an impulse or kick in a direction away from stop 48 to render the lead-out cam 29 effective whereupon the record changing cycle will carry through to completion. In general, records of the disk type which are provided with a spiral sound groove 120 as is shown in Fig. 1 of the drawings for guiding the needle of the tone arm are provided with means for increasing the velocity of the tone arm when the playing of the record has been completed. Such means may comprise an oscillating groove such as is shown at 121 in Fig. 1 or a groove which spirals towards the center of the record much more rapidly than the sound groove 120. Means for initiating the operation of the record changer mechanisms of automatic phonographs have been used heretofore, which depend upon the change in velocity of the tone arm as it enters the oscillating or spiral groove at the end of the record. However, these arrangements have been very complicated, unreliable and generally expensive to manufacture. In accordance with the present invention, there is provided a velocity trip arrangement which is substantially simpler than the arrangements hitherto used for the same purpose and which due to its simplicity, may be manufactured in a more durable and strong manner thereby providing more reliable operation.

Figure 9:
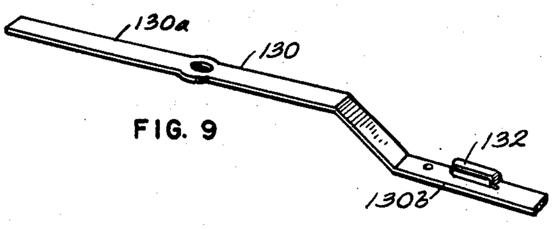
Fig. 9 is a perspective view of the velocity trip lever employed in the record changing mechanism of the present invention.

In accordance with the present invention, a velocity trip lever 130, best shown in the perspective view of Fig. 9, but also shown in Figs. 3, 4, 6 and 7 of the drawings comprises a lever having a horizontal portion 130*a* which is pivotably mounted as indicated at 131 to the edge of the main control arm 36, whereby the velocity trip lever 130 is normally arranged in parallel relationship with the arm 36. Velocity trip lever 130 also includes a portion 130*b* which is at a different horizontal level than the portion 130*a* and which includes a narrow ear portion 132 which is formed from a punched-out portion of the lever 130 and is positioned in a somewhat different plane from the portion 130*b*. As is best shown in Figs. 6 and 7, the ear portion 132 is farther away from the underside of the turntable than the portion 130*b* thereof. A suitable spring 133 interconnects the portion 130*b* of lever 130 with the main control arm 36. These springs have been shown in Figs. 6 and 7 to aid in understanding the disclosure although actually they would not be visible in these views. Normally, the velocity trip lever 130 is held in the position shown in Fig. 6 of the drawings with the ear 132 hooked under the portion of the cam follower 40 extending beyond pin 41. In this position, the lug 17 on the turntable hub 16 is free to rotate without engaging velocity trip lever 130. The portion 130*a* of the velocity trip lever 130 is in the path of movement of the pin 63 of the friction arm 60 mentioned above. As the tone arm or pick-up unit 12 moves towards the center of the turntable due to the needle associated therewith following the spiral groove 120 in the record being played, friction arm 60 moves with the tone arm so that pin 63 moves into engagement with velocity trip lever 130 tending to move the ear 132 out from beneath the overhanging portion of cam follower 40 shown in Fig. 6. Each rotation of turntable 11, however, causes the lug 17 to engage the ear 132 and move it back and at the same time moving friction arm 60 relative to the tone arm shaft 51. As long as the tone arm moves toward the center of the turntable 11 at the relatively slow velocity governed by the sound groove 120, lug 17 prevents ear 132 from moving away from cam follower 40 or in other words, the ear 132 remains in the position shown in Fig. 6 of the drawings. The friction arm 60 consequently moves relative to the tone arm becoming more and more nearly in phase with the tone arm 12. When, however, the needle of the pick-up unit or tone arm 12 enters the oscillating groove 121, the tone arm moves toward the center of the turntable at a much greater velocity and in fact, the pin 63 of the friction arm 60 moves the velocity trip 130 out of the position shown in Fig. 6 into the position shown in Fig. 7 of the drawings in less than one revolution of the turntable whereby lug 17 is ineffective to prevent such action. A suitable stop, not shown, preferably associated with the arm 36 limits the movement of the velocity trip lever 130 under the bias spring 133 to that shown in Fig. 7 of the drawings. It is quite obvious that the portion 130*b* of the velocity trip lever 130 is now in the path of the lug 17 so that upon the next revolution of the turntable 11, lug 17 engages the portion 130*b* of the velocity trip lever 130 and pushes it and the cam follower 40 away from stop 48 into effective engagement with the lead-out cam 29, whereby the record changing cycle is initiated. The friction arm 60 is reset to its desired relative position on shaft 51 during the record changing operation by engagement with a stop 135 extending from the top member 10. When the tone arm 12 moves to one side of the turntable during a record changing cycle, friction arm 60 moves until it engages stop 135. When the tone arm is returned to its initial position for playing a new record, friction arm 60 is substantially in the position shown in Fig. 3 of the drawings with the pin 63 adjacent the velocity trip lever 130.

In view of the detailed description included above, the operation of the record changing mechanism of the present invention will be obvious and a detailed description thereof is deemed unnecessary. The velocity trip lever just described controls the instant when the spiral lead-out cam 29 is rendered effective whereupon the design of the reversely arranged spiral cams on the underside of the turntable causes the arm 36 to pivot first in a counterclockwise direction, as viewed in Fig. 3 of the drawings, and then in a clockwise direction until it has returned to its initial position against stop 48. During this time, one end of the swinging arm 36 controls the operation of the tone or pick-up arm while the other end controls the record release mechanism, the two devices being controlled in timed sequence with respect to one another.

It will be understood that suitable control means for the automatic phonograph not shown will be provided. Such control means will include a switch for the motor 13 and generally also will include a reject button of some sort for initiating the record changing operation before a record has been completely played or changing records successively without all of these records being played. It will be understood that such a reject button merely needs to provide the arm 36 with an impulse to move it away from stop 48 into engagement with the lead-out cam 29 whereupon the record changing cycle will be initiated.

It is obvious from the above discussion that a record changing mechanism for an automatic phonograph or like machine has been provided which is much less complicated than prior art arrangements, which furthermore is positive in operation, readily adaptable for the accommodation of either 10 or 12 inch records and which consists of few parts requiring adjustment. Furthermore, the record changing mechanism is substantially completely disposed beneath the turntable and out of sight to provide for a neat appearance of the automatic phonograph.

Although a preferred embodiment of the present invention has been disclosed in complete detail so as to ensure a complete understanding of the invention, it is contemplated that details of the disclosed structure are capable of modification and that other applications and features of the invention may occur to those skilled in the art. Hence, it is intended in the appended claims to cover all such modifications as fall within the true spirit and scope of the present invention.

I claim:

1. Record changing apparatus for a sound reproducing device having a rotary turntable mounted on a fixed support, comprising a pair of oppositely directed spiral grooves formed in said turntable on the underside thereof and defining respectively a lead-out cam and a lead-in cam, a member pivoted intermediate its ends to said fixed support and having one end thereof disposed adjacent to the underside of said turntable and to one side of the axis of said turntable, a cam follower pivotally mounted to said one end of said member, means on said cam follower adapted to engage either said lead-out cam or said lead-in cam depending upon the pivotal position of said cam follower, means for selectively positioning said cam follower so that said member is caused to pivot in one direction by said lead-out cam in response to rotation of said turntable and to move back to its initial position when said lead-in cam is rendered effective, in response to continued rotation of said turntable, and a pair of means one engageable with each end of said member to perform the record changing functions in timed sequence in response to the cyclic movement of said member.

2. Record changing apparatus for a sound reproducing device having a rotary turntable mounted on a fixed support, a first groove formed in said turntable on the underside thereof in the form of a spiral of increasing diameter starting a predetermined distance from the center of said turntable and defining a lead-out cam, a second groove formed in said turntable on the underside thereof in the form of a spiral of decreasing diameter starting near the periphery of said turntable and defining a lead-in cam, said grooves having a common portion at the junction thereof, a main control arm mounted to said support for pivotal movement relative thereto with one end thereof positioned adjacent the underside of said turntable and to one side of the axis of said turntable, a cam follower pivoted to and extending transversely of said one end of said arm, a first pin extending from one end of said cam follower toward said lead-out cam so that when in effective engagement therewith said main control arm moves in one direction in response to rotation of said turntable, a second pin extending from the other end of said cam follower toward said lead-in cam so that when in effective engagement therewith said arm moves in the other direction in response to rotation of said turntable, means effective to engage said first pin with said lead-out cam for rendering said lead-out cam effective to move said arm in said one direction, means responsive to said first pin reaching the end of said lead-out cam for disengaging said first pin from said lead-out cam and engaging said second pin with said lead-in cam, thereby rendering said lead-in cam effective to return said arm to its initial position in response to continued rotation of said turntable, and means responsive to said second pin reaching the end of said lead-in cam for moving said first pin so as to be in position for engaging said lead-out cam upon a subsequent operation of said means for rendering said lead-out cam effective.

3. In an automatic phonograph which has a movably mounted control arm adapted to perform a cycle of reciprocatory movement whereby a record changing operation is effected, a flat turntable having on the underside thereof a pair of oppositely directed spiral grooves respectively adapted to cam the control arm forward and back and being bodily displaced radially from each other on the turntable, one of said grooves spiralling from the center toward the outside of the turntable, and the other of said grooves spiralling from the outside toward the center of the turntable, and means adapted to selectively engage said grooves to selectively reciprocate the control arm back and forth.

4. A phonograph turntable as defined in claim 3, wherein the outer end of said one groove communicates with the inner end of said other groove.

5. In a record changing mechanism for an automatic phonograph having a fixed support and a turntable rotatably mounted thereon, a main control arm pivotally mounted on said support on the opposite side from said turntable and having an end portion to one side of the axis of said turntable, means including a pair of spiral cams formed on the underside of said turntable and respectively adapted during a record changing cycle to cooperatively be engaged with said end portion of said control cam to move said control arm in cyclic fashion first in one direction and then back to its original position, a cam follower device secured to said end portion of said control arm and having an inactive position and two active positions, said device being effective when in its first active position to cooperatively engage said control arm with one of said cams and being effective while in its second active position to cooperatively engage said control arm with the other of said cams, means for initiating the cyclic movement of said control arm by causing said cam follower device to assume its first active position, said spiral cam means including provisions for automatically causing said cam follower device to assume the second active position thereof when it has traversed the first cam, and means responsive to such cyclic movement of said control arm for automatically changing records on said phonograph.

6. Record changing apparatus for a sound reproducing device having a rotary turntable mounted on a fixed support and a tone arm mounted for pivotal movement across the turntable, comprising a pair of oppositely directed spiral grooves formed in said turntable on the underside thereof and defining respectively a lead-out cam and a lead-in cam, a member pivoted intermediate its ends to said fixed support and having one end thereof disposed adjacent to the underside of said turntable and to one side of the axis of said turntable, a cam follower pivotally mounted to said one end of said member, means on said cam follower adapted to engage either said lead-out cam or said lead-in cam depending upon the pivotal position of said cam follower, trip means responsive to a selected movement of the tone arm for selectively positioning said cam follower so that said member is caused to pivot in one direction by said lead-out cam in response to rotation of said turntable and to move back to its initial position when said lead-in cam is rendered effective in response to continued rotation of said turntable, and means engageable with said member to perform the record changing functions in timed sequence in response to the cyclic movement of said member.

7. Record changing apparatus for a sound reproducing device including in combination, a flat rotary turntable mounted on a fixed support, a tone arm mounted for pivotal movement across the turntable, said turntable having a pair of oppositely directed spiral grooves formed on the underside thereof and defining respectively a lead-out cam and a lead-in cam, a member movably mounted on said fixed support and having a portion thereof disposed adjacent the underside of said turntable and to one side of the axis thereof, cam follower means mounted on said portion of said member having portions movable to first and second positions for engaging respectively said lead-out cam and said lead-in cam, trip means responsive to a selected movement of the tone arm for selectively positioning said engaging portions of said cam follower means to a first position so that said member is caused to move in one direction by said lead-out cam in response to rotation of said turntable, and to a second position to move said member back to its initial position by said lead-in cam upon continued rotation of said turntable, and means engageable with said member to perform the record changing functions in timed sequence in response to the cyclic movement of said member.

RUDOLPH A. BECWAR.

References Cited in the file of this patent

UNITED STATES PATENTS

| Number | Name | Date |
|---|---|---|
| 736,972 | Johanson | Aug. 25, 1903 |
| 978,783 | Rose | Dec. 13, 1910 |
| 1,104,760 | Abraham | July 28, 1914 |
| 1,317,257 | Adams | Sept. 30, 1919 |
| 1,505,307 | Bennett | Aug. 19, 1924 |
| 1,970,691 | Collison et al. | Aug. 21, 1934 |
| 1,971,238 | Silling | Aug. 21, 1934 |
| 2,235,693 | Wells | Mar. 18, 1941 |
| 2,237,340 | Downs | Apr. 8, 1941 |
| 2,270,179 | Wright | Jan. 13, 1942 |
| 2,307,030 | Erwood | Jan. 5, 1943 |
| 2,328,703 | Becwar | Sept. 7, 1943 |
| 2,330,293 | Knox | Sept. 28, 1943 |
| 2,339,981 | Cranmer et al. | Jan. 25, 1944 |
| 2,359,132 | Libman | Sept. 26, 1944 |
| 2,371,362 | Small | Mar. 13, 1945 |
| 2,394,539 | Erwood et al. | Feb. 12, 1946 |
| 2,488,137 | Morrison | Nov. 15, 1949 |
| 2,488,260 | Ascoli | Nov. 15, 1949 |

FOREIGN PATENTS

| Number | Country | Date |
|---|---|---|
| 7,422 | Great Britain | Sept. 29, 1914 |